(12) United States Patent
Heinzl (10) Patent No.: US 9,849,401 B2
(45) Date of Patent: Dec. 26, 2017

(54) DISTILLATION STATION (75) Inventor: Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 910 days.

(21) Appl. No.: 14/345,062

(22) PCT Filed: Jul. 26, 2012

(86) PCT No.: PCT/EP2012/064685
§ 371 (c)(1),
(2), (4) Date: Jun. 16, 2014

(87) PCT Pub. No.: WO2013/037554
PCT Pub. Date: Mar. 21, 2013

(65) Prior Publication Data
US 2014/0318945 A1    Oct. 30, 2014

(30) Foreign Application Priority Data
Sep. 14, 2011 (DE) .................. 10 2011 113 314

(51) Int. Cl.
*B01D 3/14* (2006.01)
*B01D 63/00* (2006.01)
(Continued)

(52) U.S. Cl.
CPC .............. *B01D 3/14* (2013.01); *B01D 3/145* (2013.01); *B01D 61/36* (2013.01); *B01D 61/364* (2013.01); *B01D 63/00* (2013.01); *C02F 1/448* (2013.01)

(58) Field of Classification Search
CPC .......... B01D 3/14; B01D 3/145; B01D 61/36; B01D 61/364; B01D 63/00
See application file for complete search history.

(56) References Cited

U.S. PATENT DOCUMENTS 7,837,877 B2 * 11/2010 Cao .................. B01D 3/065
                                                            210/502.1
2004/0211725 A1    10/2004 Jansen et al.
(Continued)

FOREIGN PATENT DOCUMENTS

CN        101647316        2/2010
DE    10 2004 013 647    10/2005
(Continued)

OTHER PUBLICATIONS

International Search Report issued in PCT/EP2012/064685 mailed Sep. 20, 2012.

*Primary Examiner* — Jonathan Miller
(74) *Attorney, Agent, or Firm* — Mintz Levin Cohn Ferris Glovsky and Popeo, P.C.; Peter F. Corless; Steven M. Jensen (57) ABSTRACT

A distillation station for separating components of a liquid mixture, comprising a vertical distillation column split into individual separation stages by fittings and which is further split by the liquid mixture feed into a stripping chamber and an enriching chamber, wherein in the stripping chamber the lower boiling fraction of vapor from the fluid mixture rising from a column sump comprising an evaporator is stripped, and in the enriching chamber the vapor is enriched with the lower-boiling fraction, which is withdrawn from a return fluid produced due to the vapor drawn from the column head being precipitated at least partially in a condenser and returned to the rectifier column, and the return liquid and the liquid mixture preferably fed between two separating stages being routed to the fittings vertically connected in sequence. In the process, each of the fittings comprise at least one liquid channel, which is separated at least partially from the vapor chamber of the distillation column by a two-sided vapor-permeable, liquid-tight membrane wall.

18 Claims, 4 Drawing Sheets

(51) Int. Cl.
*B01D 61/36* (2006.01)
*C02F 1/44* (2006.01)

(56) References Cited

U.S. PATENT DOCUMENTS

| | | |
|---|---|---|
| 2006/0213757 A1 | 9/2006 | Yang et al. |
| 2009/0000939 A1 | 1/2009 | Heinzl |
| 2010/0243549 A1 | 9/2010 | Wynn et al. |
| 2010/0264012 A1 | 10/2010 | Yang et al. |

FOREIGN PATENT DOCUMENTS

| | | |
|---|---|---|
| DE | 10 2004 030 529 | 1/2006 |
| DE | 10 2005 053 874 | 5/2007 |
| DE | 10 2009 020 179 | 11/2010 |
| EP | 1 925 355 | 5/2008 |
| JP | 59-120637 | 7/1984 |
| JP | 2004 521734 | 7/2004 |
| JP | 3 683 054 | 8/2005 |
| JP | 2007-83138 | 4/2007 |
| JP | 2009-514668 A | 4/2009 |
| WO | 2010/127819 | 11/2010 |

\* cited by examiner

DISTILLATION STATION

CROSS-REFERENCE TO RELATED APPLICATIONS

This application is a National Phase application filed under 35 USC 371 of PCT International Application No. PCT/EP2012/064685 (WO 2013/037554) with an International Filing Date of Jul. 26, 2012, which claims under 35 U.S.C. §119(a) the benefit of German Application No. 10 2011 113 314.7, filed Sep. 14, 2011, the entire contents of which are incorporated herein by reference.

The invention relates to a distillation plant for separating components of a liquid mixture having a vertical rectifier column which is divided into individual separation stages by installations and which is furthermore divided by the liquid mixture inflow into a stripper column and into an enrichment column, wherein the lower boiling fraction of the vapor from the liquid mixture rising from a tower sump comprising an evaporator is stripped and the vapor is enriched in the enrichment column with the lower boiling fraction which is extracted from a return liquid which is generated in that vapor removed at the tower head is precipitated at least in part in a condenser and is returned into the rectifier column and the return liquid as well as the liquid mixture, preferably supplied between two separation stages, are conducted in the installations following one another vertically and connected to one another.

Rectification is the enrichment of the lower boiling fraction in a liquid by a counterflow of vapor and condensate in a vertical rectifier column. In principle, rectification in a rectifier column between the evaporator and the condenser is based on the fact that the vapor rising from the evaporator flows counter to the liquid trickling out of the condenser. There is a heat transfer and a mass transfer between the vapor and the liquid. In this respect, the higher boiling fraction condenses from the vapor and migrates into the liquid. The lower boiling fraction evaporates from the liquid due to the condensation heat which is released and migrates into the vapor. The vapor is enriched with the lower boiling fraction, with its temperature constantly reducing in the flow direction. The liquid is enriched with the higher boiling fraction, with its temperature constantly increasing in the flow direction.

The heat transfer and mass transfer is intensified by the installations which are provided in the rectifier column and by which the phase boundary surface and the contact time of the two phases are to be increased. The rectifier column is divided into individual separation stages by these installations.

The rectifier column is additionally divided into a stripper column and into an enrichment column by the liquid mixture inflow. In this respect, the lower boiling fraction is stripped in the stripping column from the vapor from the liquid mixture rising from the tower sump comprising the evaporator, whereas the vapor is enriched in the enrichment column with the lower boiling fraction which is extracted from the return liquid. This return liquid is preferably generated in that vapor removed at the tower head is precipitated at least in part in the condenser and is conducted back into the rectifier column. The return liquid as well as the liquid mixture preferably supplied between two separation stages are conducted in the installations following one another vertically and connected to one another.

Components of a liquid mixture having different vapor pressures can be separated in the rectifier column, with always only a separation of two liquid components being possible. The lower boiling fraction in the mixture vapor and the higher boiling fraction in the liquid are enriched in the rectifier column by a counterflow of liquid and vapor. Since the heated vapor rises, the rectifier column is designed in a vertical construction.

A conventional distillation plant for separating components of a liquid mixture is known from the document US 2004/0211725 A1. Documents US 2006/0213757 A1 and DE 10 2005 053 874 A1 describe apparatus and methods for membrane distillation.

It is the objective of all constructions to bring the liquid and the vapor into contact as uniformly as possible over an area which is as large as possible over the tower height in order in particular to increase the mass transfer and to increase the separation effect as well as the enrichment ratio.

In the previously customary distillation plants, tray towers are used whose installations are provided in the form of bubble trays, tunnel trays, valve trays and screen trays. In particular the separation effect, the pressure loss, the construction height and the plant costs are decisive for the evaluation of the installations.

It is essentially the underlying object of the invention to provide an improved distillation plant of the initially named kind which is configured as modular at least in part and with which a more uniform liquid distribution, greater phase boundary surfaces and longer contact times of the two phases are achieved in the rectifier column, in particular with a pressure loss which is as low as possible.

This object is satisfied in accordance with the invention in that the installations each comprise at least on liquid passage which is separated at least in part from the vapor space of the rectifier column by a membrane wall which is vapor permeable and liquid tight at both sides.

An at least partly modular design of the distillation plant is possible due to this design. In addition, in particular a more uniform liquid distribution, larger phase boundary surfaces and longer contact times of the two phases are achieved by the installations in accordance with the invention in the rectifier column.

The installations are connected to one another such that their liquid passages are each completely filled with liquid.

This could now admittedly be achieved, for example, in that the liquid outflow is throttled and a head of water is built up. The head of water would, however, have the result that the membrane would be exposed to a higher pressure and temperature load in the lower, hotter region of the rectifier column as a result of the higher static pressure than in the upper, colder region of the rectifier column.

In accordance with the invention, in particular for the reduction of this pressure load, vertically adjacent installations are each connected to one another via a return passage which is arranged between a liquid outlet provided in a lower region of a liquid passage of the upstream installation viewed in the direction of flow of the liquid and a liquid inlet provided in an upper region of a liquid passage of the downstream installation and, starting from the liquid outlet of the upstream installation, is first conducted upwardly at least up to the uppermost possible liquid level in this installation.

It is ensured by the upward conducting of the return passage at the liquid outlet of the upstream installation to at least the uppermost possible liquid level that the liquid conducting liquid passage or passages of a respective installation are each completely filled with liquid.

In this respect, the return passage is configured in the manner of a U pipe. In this respect, in accordance with the invention, the upper region of the outflow part of the return passage configured in the manner of a U pipe comprises a passage section which is at least partly bounded by a further membrane wall, which is again preferably vapor permeable and liquid tight at both sides, which comes into contact with the liquid, on the one hand, and with the vapor space of the rectifier column, on the other hand. It is thus ensured that with a freely outflowing liquid and while avoiding a liquid jam over the tower height at a respective tower installation, always only at a maximum the level of the head of liquid of a tower installation loads the respective membrane wall. In this respect, the relationship results from the hydrostatic base equation while assuming the incompressibility of the liquid (ρ=const.) for the pressure p (y) dependent on the height y:

$$p(h)=\rho \cdot g \cdot h + p(0), \text{ where}$$

ρ=density of the liquid,
g=gravity acceleration,
h=extent of the head of liquid in the y direction, and
p(y=0)=pressure at the surface of the head of liquid.

The absolute pressure in the vapor space of the rectifier column is preferably correspondingly lowered to increase the vapor passage through the membrane walls of the liquid passages of the installations. The portion of inert gases in the respective installations at least partly bounded by a membrane wall which is vapor-permeable, liquid tight or microporous and hydrophobic at both sides is thus reduced, whereby the vapor passage is accelerated in both directions. As already mentioned, a respective membrane wall is open in both directions for the vapor passage.

At least one installation advantageously comprises at least one liquid passage which preferably extends generally vertically and has at least one flat membrane. In principle, all the liquid passages of the installations can each comprise at least one such flat membrane.

However, such embodiments are also conceivable in which at least one installation has at least one liquid passage having a spiral winding configuration which is bounded at at least two mutually oppositely disposed sides by the vapor-permeable, liquid-tight membrane wall. In general, all installations of the rectifier column can each comprise such a spiral membrane winding configuration.

In accordance with a further advantageous embodiment of the distillation plant in accordance with the invention, at least one installation can also comprise at least one liquid passage which preferably extends generally vertically in the form of a hollow membrane thread. In general, all installations of the rectifier column can each comprise one or more such liquid passages in the form of hollow membrane threads.

At least one installation preferably comprises a plurality of liquid passages connected in parallel and preferably each extending generally vertically. In this respect, the liquid passages connected in parallel can in particular be arranged horizontally next to one another. In general, all installations of the rectifier column can each comprise such liquid passages connected in parallel and in particular arranged horizontally next to one another.

In this respect, at least one installation is preferably provided which comprises a plurality of liquid passages which are connected in parallel, which are arranged horizontally next to one another and which are each separated from the vapor space of the rectifier column at at least two mutually oppositely disposed sides by a flat membrane. In this respect, a respective pair of horizontally adjacent liquid passages preferably has mutually facing flat membranes which laterally bound a vapor passage through which vapor rising from the tower sump flows into and through the vapor space of the rectifier column.

In accordance with an exemplary expedient embodiment of the distillation plant in accordance with the invention, at least one installation is provided which comprises a plurality of liquid passages connected in parallel, arranged horizontally next to one another and in the form of hollow membrane threads whose vapor-permeable, liquid-tight membrane wall respectively comes into contact with vapor rising from the tower sump into the vapor space of the distillation column.

In this respect, a plurality of hollow membrane threads can be provided which are connected in parallel, which are distributed horizontally in an x direction and in a y direction perpendicular thereto, to which the liquid is supplied via x and y direction distributors provided in their upper region and from which the liquid is led off via x and y direction collectors provided in their lower region.

The vapor permeable, liquid tight membrane walls can therefore, for example, comprise flat membranes, spiral membrane winding configurations or hollow threads, with the membranes advantageously not having any preferred direction for the vapor passage. They are open both for the vapor which flows from the vapor space through the membrane into the liquid, which condenses and which contains more higher boiling fractions and for the vapor which is produced from the liquid and which contains more low boiling fractions. As stated, spiral membrane winding configurations are also conceivable, for example, which are each bounded at at least two mutually oppositely disposed sides by a vapor permeable, liquid tight membrane wall. The installations 14 can each be of the same kind in the rectifier column 16. It is, however, also possible that the rectifier column 16 comprises installations of different kinds at least in part.

The installations of the rectifier column can be built up in a simple modular manner at least in part using the membranes, in particular the flat membranes.

In order also to allow a modular design of the evaporator associated with the tower sump at least in part, the evaporator in accordance with a preferred embodiment of the distillation plant in accordance with the invention comprises at least one evaporation unit having a heating medium passage flowed through by a heating medium and bounded at least in part by a heat conductive, vapor tight and liquid tight wall and having a liquid passage which is adjacent to the heat conductive wall, which is acted on by liquid from the rectifier column and which is separated from the vapor space of the tower sump by a vapor permeable, liquid tight membrane wall at its side disposed opposite the heat conductive wall and from which the sump product can be removed.

In this respect, at least one evaporation unit is advantageously provided which comprises at at least two mutually oppositely disposed sides of the heating medium passage a respective liquid passage which is separated from said heating agent passage by a heat conductive, vapor tight and liquid tight wall, which is acted on by liquid from the rectifier column or its installations and which is separated from the vapor space of the tower sump at its side disposed opposite the heat conductive wall by a vapor permeable, liquid tight membrane wall.

The evaporator can in particular comprise a plurality of evaporation units connected in parallel with respect to the supplied liquid from the rectifier column.

In this respect, the evaporation units preferably each extending generally vertically are advantageously arranged horizontally next to one another. A respective pair of horizontally adjacent evaporation units can, for example, have mutually facing flat membranes by which the adjacent liquid passages of these adjacent evaporation units are separated from the vapor space of the tower sump.

The distillation plant in accordance with the invention can be built up of a plurality of frame elements as a modular flow system at least in part, with different functional units such as in particular a respective liquid passage of the installations of the rectifier column as well as a respective heat passage and a respective liquid passage of the evaporation units of the evaporator associated with the tower sump each being able to be provided in the form of such a frame element. The frame elements can be provided with web structures via which they can be connected to one another, for example, for forming a column installation comprising a plurality of liquid passages connected in parallel or for forming the evaporation units. The frame elements can comprise at least in part an inner region which is surrounded by an outer frame and which can preferably be provided with a spacer, in particular a grid-like spacer, which can in particular be provided at at least one side with a respective functional surface for forming a respective channel, said functional surface advantageously respectively being formed by a film or by a membrane, in particular a flat membrane.

Figure 1:
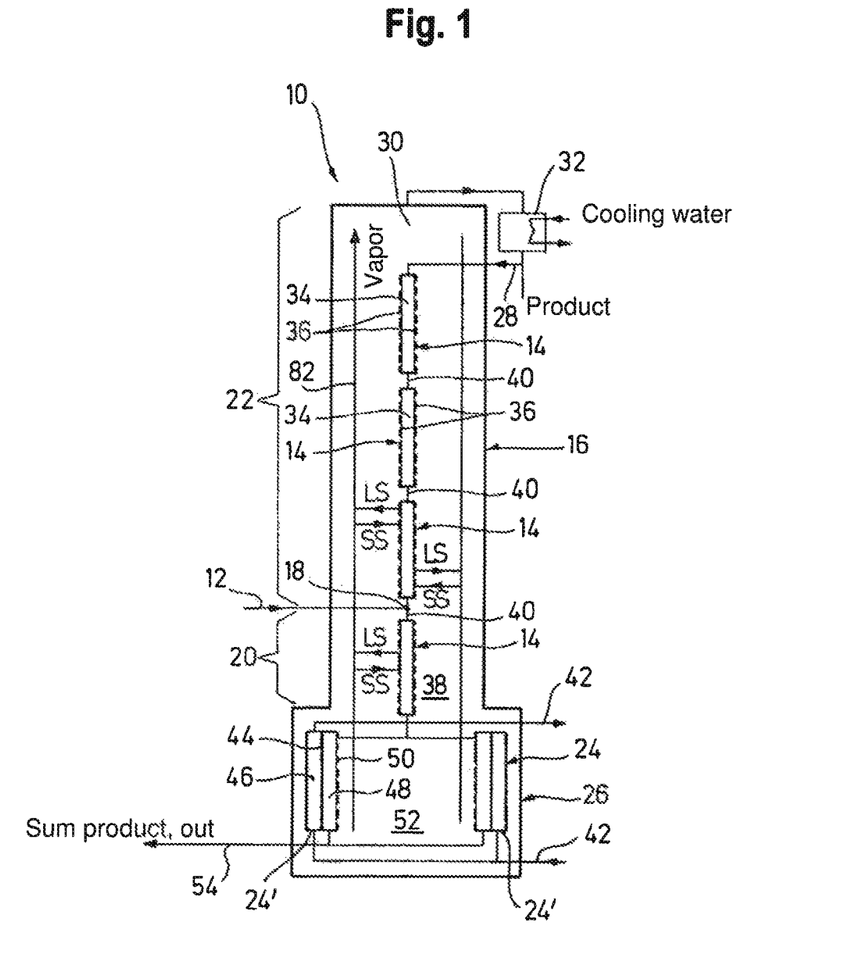
FIG. 1 a schematic representation of an exemplary embodiment of a distillation plant.

The invention will be explained in more detail in the following with reference to embodiments and to the drawing; there are shown in this:

FIG. 1 shows in a schematic representation an exemplary embodiment of a distillation plant 10 for separating components of a liquid mixture 12.

The distillation plant 10 comprises a vertical rectifier column 16 which is divided into individual separation stages by installations 14 and is moreover divided into a stripper column 20 and an enrichment column 22 by the liquid mixture inflow 18.

In this respect, the low boiling fraction LS is stripped in the stripper column 20 from vapor from the liquid mixture rising from a tower sump 26 comprising an evaporator 24, while the vapor in the enrichment column 22 is enriched with a lower boiling fraction which is extracted from a return liquid 28 which is generated in that vapor removed at the tower head 30 is precipitated at least in part in a condenser 32 and is conducted back into the rectifier column 16.

The return liquid 28 as well as the liquid mixture 12 preferably supplied between two separation stages are conducted in the installations 14 following one another vertically and connected to one another.

The installations 14 each comprise at least one liquid passage 34 which is separated at least in part from the vapor space 38 of the rectifier column 16 by a membrane wall 36 which is vapor permeable and liquid tight at both sides.

As illustrated by the arrows LS and SS in FIG. 1, the higher boiling fraction SS condenses from the vapor and migrates into the liquid, whereas the low boiling fraction LS evaporates from the liquid through the condensation heat which is released and migrates into the vapor.

The installations 14 are expediently connected to one another such that their liquid passages 34 are each completely filled with liquid. In this respect, vertically adjacent installations 14 can each be connected to one another via a return passage 40 such as will be explained in more detail further below with reference to FIG. 2.

The absolute pressure in the vapor space 38 of the rectifier column 16 is expediently lowered for increasing the vapor passage through the membrane walls 36 of the liquid passages 34 of the installations 14.

At least one installation 14 can advantageously comprise at least one liquid passage 34 which preferably extends generally vertically and has at least one flat membrane 36'. In the exemplary embodiment in accordance with FIG. 1, all installations 14 of the rectifier column 16 each comprise at least one such liquid passage 34 having at least one flat membrane 36'.

As described further below with reference to FIGS. 4 and 5, at least one installation 14 can also be provided having at least one liquid passage 34 with a spiral winding configuration 70 or having at least one liquid passage 34 in the form of a hollow membrane thread 72.

As can moreover be seen from FIG. 1, the evaporator 24 associated with the tower sump 26 can comprise at least one evaporation unit 24' having a heating medium passage 46 which is flowed through by a heating medium 42 and which is bounded at least in part by a heat conductive, vapor tight and liquid tight wall and having at least one liquid passage 48 which is adjacent to the heat conductive wall 44, which is acted on by liquid from the rectifier column 16 or its installations 14 and which is separated from the vapor space 52 of the tower sump 26 at its side disposed opposite the heat conductive wall 44 by a vapor permeable, liquid tight membrane wall 50 and from which the sump product 54 can be removed. If the evaporator 24 comprises a plurality of evaporation units 24', their heating medium passages 46 can preferably be supplied via a common heating medium circuit.

As already mentioned, the installations 14 of the rectifier column 16 are advantageously connected to one another such that their liquid passages 34 are each completely filed with liquid. In this respect, vertically adjacent installations 14 can each be connected to one another via a return passage 40 (cf. also FIG. 2) which is arranged between a liquid outlet 58 provided in a lower region of a liquid passage 34 of the upstream installation viewed in the flow direction 56 of the liquid and a liquid inlet 60 provided in an upper region of a liquid passage of the downstream installation and is conducted upwardly starting from the liquid outlet 58 of the upstream installations initially at least up to the uppermost possible liquid level in this installation.

Figure 2:
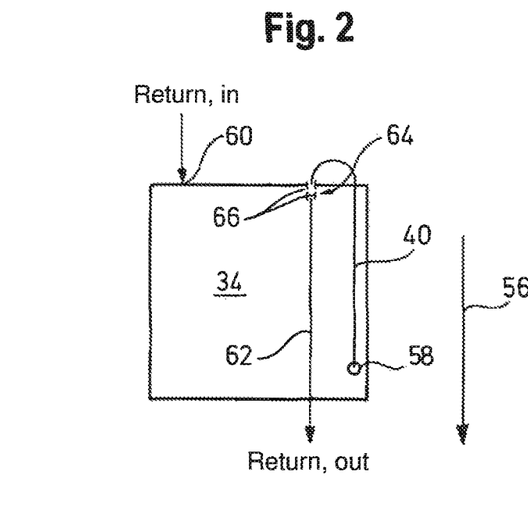
FIG. 2 a schematic representation of an exemplary installation of the rectifier column having a return passage configured in the manner of a U-pipe.

As can be recognized with reference to FIG. 2, the return passage 40 can be configured in the manner of a U pipe. In this respect, the upper region of the outflow part 62 of such a return passage 40 configured in the manner of a U pipe can comprise a passage section 64 which is bounded at least in part by a further membrane wall 66 which is preferably again vapor permeable and liquid tight at both sides and which comes into contact with the liquid, on the one hand, and with the vapor space 38 of the rectifier column 16 (cf. FIG. 1), on the other hand.

Figure 3:
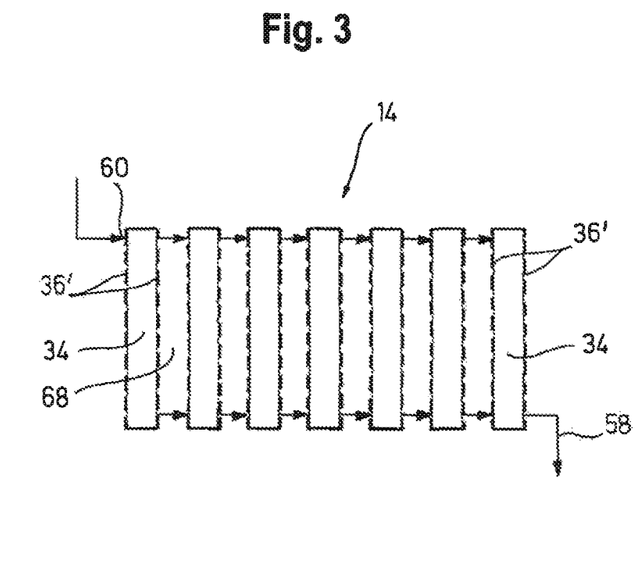
FIG. 3 a schematic representation of an exemplary installation of the rectifier column having a plurality of liquid passages connected in parallel and preferably each extending generally vertically.

FIG. 3 shows in a schematic representation an exemplary installation 14 of the rectifier column 16 with a plurality of liquid passages 34 connected in parallel and preferably each extending generally vertically. In this respect, the liquid passages 34 connected in parallel can in particular be arranged horizontally next to one another.

In this respect, in particular at least one installation 14 can be provided which comprises a plurality of liquid passages 34 which are connected in parallel, which are arranged horizontally next to one another and which are each separated from the vapor space 38 of the rectifier column 16 (cf. also FIG. 1) at at least two mutually oppositely disposed sides by a flat membrane 36', wherein a respective pair of horizontally adjacent liquid passages 34 preferably has mutually facing flat membranes 36' which laterally bound a vapor passage 68 through which vapor flows which rises from the tower sump 26 into the vapor space 38 of the rectifier column 16.

As can moreover be recognized with reference to FIG. 3, the liquid passages 34 of a respective installation 14 which are connected in parallel and are preferably each vertical can be connected to one another in each case both in the upper region and in the lower region so that they are flowed through in parallel by the liquid. With such an installation 14 comprising a plurality of liquid passages 34 connected in parallel and arranged horizontally next to one another, the liquid inlet 60 can in particular be provided in the upper region of the first liquid passage 34 and the liquid outlet 58 can in particular be provided in the lower region of the last liquid passage 34.

The flat membranes 36' in the lower region or in the upper region can, for example, be provided with corresponding bores for connecting the liquid passages 34 of a respective installation 14 which are connected in parallel and which are arranged horizontally next to one another.

The liquid passages 34 respectively membrane-bounded at least in part can in particular be built up of frame elements connected in parallel so that a stack-like installation 14 is obtained. A plurality of such stacks or installations 14 can be arranged vertically above one another. In this respect, in particular a respective return passage 40 in the manner of a U pipe can again be provided between vertically adjacent stacks (cf. FIG. 2).

Figure 4:
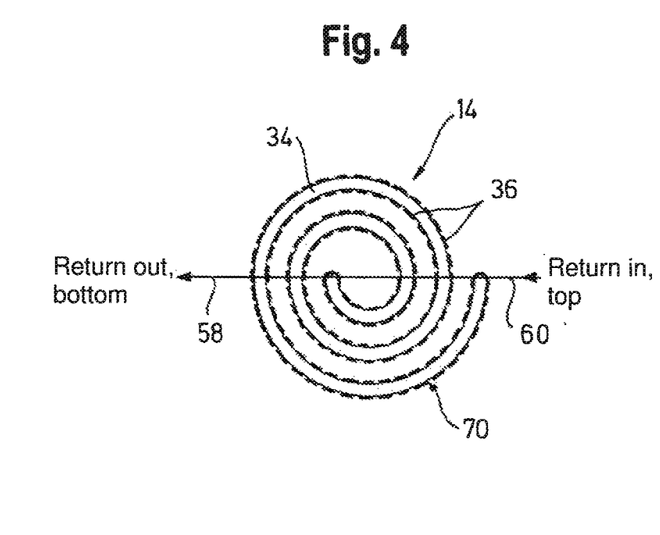
FIG. 4 a schematic representation of an exemplary installation of the rectifier column which comprises at least one liquid passage having a spiral membrane winding configuration.

FIG. 4 shows in a schematic representation an exemplary installation 14 of the rectifier column 16 which comprises at least one liquid passage 34 having a spiral membrane winding configuration 70 which is e.g. bounded at at least two mutually oppositely disposed sides by the vapor permeable, liquid tight membrane wall 36. An exemplary embodiment of such a spiral membrane winding configuration 70 is shown in plan view in FIG. 4. The spiral can in particular be configured as a double spiral, with the membrane bounding the liquid passage 34 at at least two mutually oppositely disposed sides. The membrane passage can be closed at the two end faces. The return liquid 28 (cf. also FIG. 1) flows in this case upward toward the spiral membrane winding configuration 70, while it exits in the lower region of the spiral membrane winding configuration 70. The liquid inlet 60 can therefore be provided in the present embodiment in the region of the upper end of the spiral membrane winding configuration 70, while the liquid outlet 58 can be provided in the region of the lower end of the spiral membrane winding configuration 70.

A plurality of such installations 14 respectively provided with a spiral membrane winding configuration can be arranged vertically above one another, with vertically adjacent installations 14 in particular again being able to be connected to one another via a return passage 40 in the manner of a U pipe (cf. FIG. 2).

Figure 5:
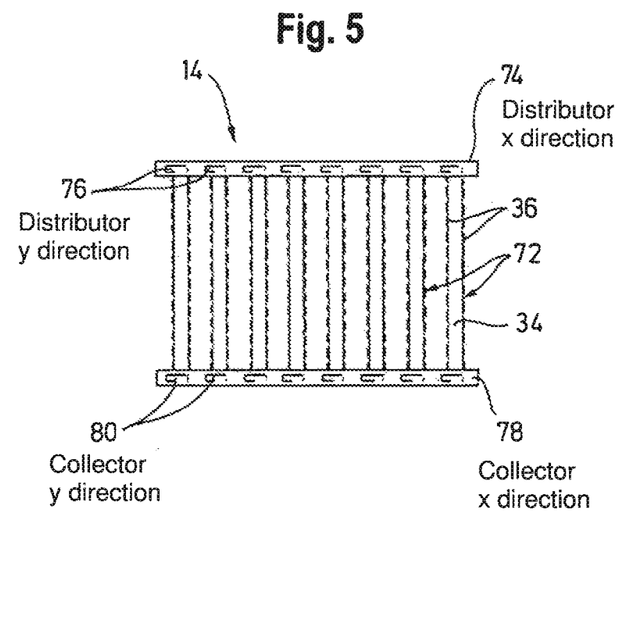
FIG. 5 a schematic representation of an exemplary installation of the rectifier column having a plurality of liquid passages connected in parallel and preferably each extending generally vertically in the form of hollow membrane threads.

The rectifier column 16 can, for example, also comprise at least one installation 14 having at least one liquid passage 34 preferably extending generally vertically in the form of a hollow membrane thread 72 (cf. FIG. 5). FIG. 5 shows in a schematic representation an exemplary installation 14 of the rectifier column 16 having a plurality of liquid passages 34 connected in parallel and preferably respectively extending generally vertically in the form of such hollow membrane threads 72 whose vapor permeable, liquid tight membrane wall 36 respectively comes into contact with vapor rising from the tower sump 26 into the vapor space 28 of the rectifier column 16 (cf. also FIG. 1).

As can be recognized with respect to FIG. 5, a respective installation 14 can in particular comprise a plurality of hollow membrane threads 72 which are connected in parallel, which are distributed horizontally in an x direction and in a y direction perpendicular thereto and to which the liquid is supplied via x and y direction distributors 74 and 76 respectively provided in their upper region and from which the liquid is drained off via x and y direction collectors provided in their lower region.

A plurality of such installations 14 comprising a respective plurality of such hollow membrane threads 72 connected in parallel can also again be arranged vertically above one another, with vertically adjacent installations in particular each again being able to be connected to one another via a return passage 40 in the manner of a U-pipe (cf. FIG. 2).

The evaporator 24 associated with the tower sump 26 can advantageously also comprise at least one evaporation unit 24' which comprises at at least two mutually oppositely disposed sides of the heating medium passage 46 a respective liquid passage 48 which is separated therefrom by a heat conductive, vapor tight and liquid tight wall 44, which is acted on by liquid from the rectifier column 16 or its installations 14 and which is separated from the vapor space 52 of the tower sump 26 at its side disposed opposite the heat conductive wall 44 by a vapor permeable, liquid tight membrane wall 50.

Figure 6:
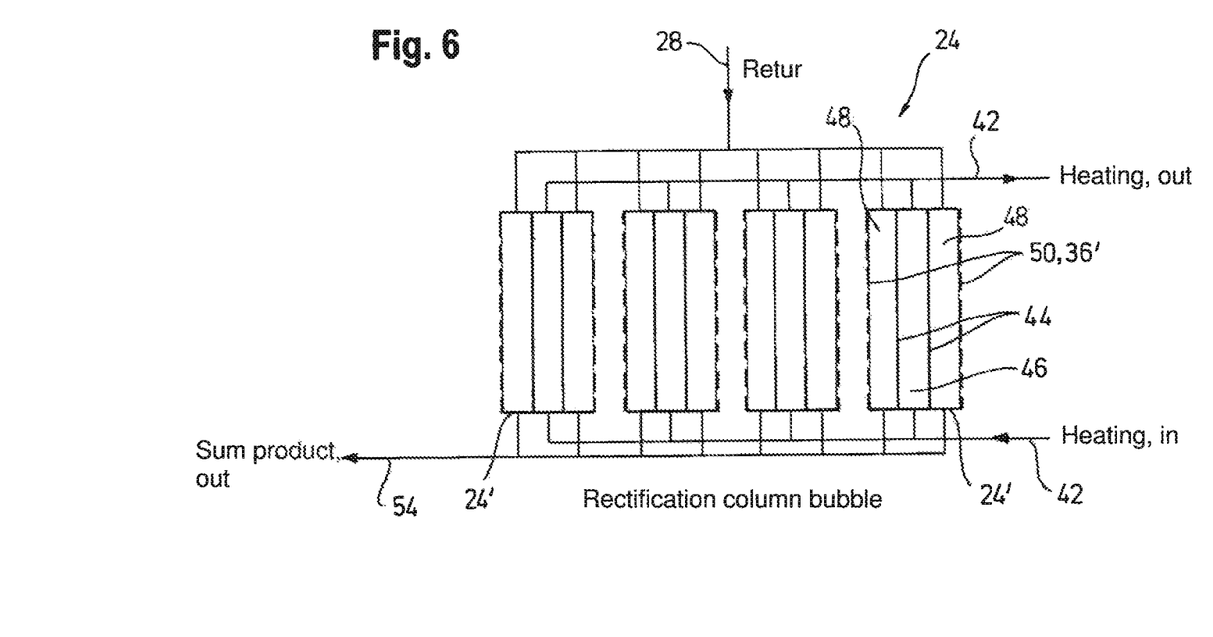
FIG. 6 a schematic representation of an exemplary embodiment of the evaporator associated with the tower sump.

FIG. 6 shows in a schematic representation an exemplary embodiment of such an evaporator 24 associated with the tower sump 26 (cf. also FIG. 1) and having a plurality of evaporation units 24' connected in parallel with respect to the supplied liquid from the rectifier column 16 or its installations 14.

In the embodiment shown in FIG. 6, the preferably respectively generally vertically extending evaporation units 24' are arranged horizontally next to one another, with a respective pair of horizontally adjacent evaporation units 24' preferably having mutually facing flat membranes 36' by which adjacent liquid passages 48 of these adjacent evaporation units 24' are separated from the vapor space 52 of the tower sump 26.

The distillation plant 10 can be built up of a plurality of frame elements as a modular flow system at least in part, with different functional units such as in particular a respective liquid passage 34 of the installations 14 of the rectifier column 16 as well as a respective heating medium passage 46 and a respective liquid passage 48 of the evaporation units 24' of the evaporator 24 associated with the tower sump 26 each being able to be provided in the form of such a frame element. The frame elements can be provided with web structures via which they can be connected to one another, for example, for forming a tower installation 14 comprising a plurality of liquid passages 34 connected in parallel (cf. FIG. 3, for example) or for forming the evaporation units 24' (cf. for example FIGS. 1 and 6). The frame elements can each comprise at least in part an inner region which is surrounded by an outer frame and which can preferably be provided with a spacer, in particular a grid-like spacer, which can in particular be provided at at least one side with a respective functional surface for forming a respective channel, said functional surface advantageously respectively being formed by a film or by a membrane, in particular a flat membrane 36'.

REFERENCE NUMERAL LIST

10 distillation plant
12 liquid mixture
14 installation of the rectifier column
16 rectifier column
18 liquid mixture inflow
20 stripper column
22 enriching column
24 evaporator
24' evaporation unit
26 tower sump
28 return liquid
30 tower head
32 condenser
34 liquid passage
36 vapor-permeable, liquid-tight membrane wall
36' flat membrane
38 vapor space of the rectifier column 16
40 return passage
42 heating medium
44 heat conductive, vapor-tight and liquid-tight wall
46 heating medium passage
48 liquid passage
50 vapor-permeable, liquid-tight membrane wall
52 vapor space of the tower sump
54 sump product
56 flow direction of the liquid
58 liquid outlet
60 liquid inlet
62 outflow part
64 passage section
66 further vapor-permeable, liquid-tight membrane wall
68 vapor passage
70 spiral membrane winding configuration
72 hollow membrane thread
74 x direction distributor
76 y direction distributor
78 x direction collector
80 y direction collector
LS lower boiling fraction
SS higher boiling fraction

The invention claimed is:

1. A distillation apparatus for separating components of a liquid mixture, comprising:
 a vertical rectifier column, wherein:
 the rectifier column is divided by installations into individual separation stages;
 the rectifier column is divided by a liquid mixture inflow into a stripper column below the liquid mixture inflow and into an enrichment column above the liquid mixture inflow;
 a lower boiling fraction is stripped in the stripper column from vapor from the liquid mixture rising from a tower sump, the tower sump comprising an evaporator;
 the vapor is enriched in the enrichment column with the lower boiling fraction, the lower boiling fraction being extracted from a return liquid, the return liquid being generated by precipitating vapor removed at a tower head at least in part in a condenser and by conducting the vapor removed at the tower head back into the rectifier column;
 the return liquid and the liquid mixture are conducted in the installations, which follow one another vertically and are connected to one another,
 the installations each comprise at least one liquid passage which is separated from a vapor space of the rectifier column at least in part by a membrane wall which is vapor permeable and liquid tight at both sides;
 vertically adjacent ones of the installations are each connected to one another via a return passage, the return passage being arranged between a liquid outlet and a liquid inlet, with the liquid outlet being provided in a lower region of the liquid passage of an upstream one of the installations viewed in a flow direction of the liquid and with the liquid inlet being provided in an upper region of the liquid passage of a downstream one of the installations and with the return passage being conducted upwardly starting from the liquid outlet of the upstream one of the installations initially at least up to an uppermost possible liquid level in the upstream one of the installations such that the liquid passages of the installations are each completely filled with liquid;
 the return passage is configured in the manner of a U pipe; and
 an upper region of an outflow part of the return passage comprises a passage section, the passage section being bounded at least in part by a further membrane wall, which comes into contact with the liquid and with the vapor space of the rectifier column.

2. The distillation apparatus in accordance with claim 1, wherein the return liquid and the liquid mixture are supplied between two separation stages.

3. The distillation apparatus in accordance with claim 1, wherein the distillation apparatus is configured such that when an absolute pressure in the vapor space of the rectifier column is lowered a vapor passage rate through the membrane walls of the liquid passages of the installations increases.

4. The distillation apparatus in accordance with claim 1, wherein at least one of the installations comprises at least one member selected from the group consisting of: the liquid passage has at least one flat membrane, and the liquid passage extends generally vertically and has at least one flat membrane.

5. The distillation apparatus in accordance with claim 1, wherein the liquid passage in at least one of the installations has a spiral membrane winding configuration which is bounded by the vapor permeable, liquid tight membrane wall at at least two mutually opposite sides.

6. The distillation apparatus in accordance with claim 1, wherein at least one of the installations comprises at least one member selected from the group consisting of: the liquid passage is in the form of a hollow membrane thread, and the liquid passage extends generally vertically in the form of a hollow membrane thread.

7. The distillation apparatus in accordance with claim 1, wherein at least one of the installations comprises a plurality of liquid passages connected in parallel and each generally vertically extending.

8. The distillation apparatus in accordance with claim 7, wherein the liquid passages connected in parallel are arranged horizontally next to one another.

9. The distillation apparatus in accordance with claim 8, wherein at least one of the installations comprises a plurality of liquid passages which are connected in parallel, which are arranged horizontally next to one another and which are respectively separated from the vapor space of the rectifier column at at least two mutually oppositely disposed sides by a flat membrane, with a respective pair of horizontally adjacent liquid passages having membranes, the membranes laterally bounding a vapor passage through which vapor rising from the tower sump flows into and through the vapor space of the rectifier column.

10. The distillation apparatus in accordance with claim 9, wherein the membranes are flat membranes mutually facing one another.

11. The distillation apparatus in accordance with claim 8, wherein at least one of the installations comprises a plurality of liquid passages connected in parallel and arranged horizontally next to one another in the form of hollow membrane threads whose vapor permeable, liquid tight membrane wall respectively comes into contact with vapor rising from the tower sump into the vapor space of the rectifier column.

12. The distillation apparatus in accordance with claim 11, wherein the plurality of hollow membrane threads is distributed horizontally in an x direction and in a y direction perpendicular thereto, the liquid being supplied to the plurality of hollow membrane threads via x and y direction distributors, the x and y direction distributors being provided in an upper region of the plurality of hollow membrane threads and the liquid being led off from the plurality of hollow membrane threads via x and y direction collectors provided in a lower region of the plurality of hollow membrane threads.

13. The distillation apparatus in accordance with claim 1, wherein the evaporator associated with the tower sump comprises at least one evaporation unit, the evaporation unit having a heating medium passage, a heating medium flowing through the heating medium passage, the heating medium passage being bounded at least in part by a heat conductive, vapor tight and liquid tight wall and the evaporation unit having a liquid passage, the liquid passage of the evaporation unit being adjacent to the heat conductive wall, being acted on by liquid from the rectifier column, and being separated from a vapor space of the tower sump at its side disposed opposite the heat conductive wall by a vapor permeable, liquid tight membrane wall and wherein the sump product is configured to be removed from the at least one liquid passage.

14. The distillation apparatus in accordance with claim 1, further comprising at least one evaporation unit which comprises a respective liquid passage at at least two mutually oppositely disposed sides of a heating medium passage, the respective liquid passages being separated from the heating medium passage by a heat conductive, vapor tight and liquid tight wall, the liquid tight wall being acted on by liquid from the rectifier column and the liquid passage being separated from a vapor space of the tower sump at a side thereof disposed opposite the heat conductive wall by a vapor permeable, liquid tight membrane wall.

15. The distillation apparatus in accordance with claim 13, wherein the evaporator comprises a plurality of evaporation units connected in parallel with respect to the supplied liquid from the rectifier column.

16. The distillation apparatus in accordance with claim 15, wherein the evaporation units are arranged horizontally next to one another, with a respective pair of horizontally adjacent evaporation units having membranes by which adjacent liquid passages of these adjacent evaporation units are separated from the vapor space of the tower sump.

17. The distillation apparatus in accordance with claim 16, wherein the evaporation units respectively generally extend vertically.

18. The distillation apparatus in accordance with claim 16, wherein membranes are flat the membranes of the respective pair of horizontally adjacent evaporation units mutually facing one another.

* * * * *